United States Patent [19]

Gullekson

[11] 3,836,776
[45] Sept. 17, 1974

[54] THREE DIMENSIONAL X-RAY OPAQUE FOREIGN BODY MARKER DEVICE

[76] Inventor: Edwin H. Gullekson, 1721 Laurel Oak Dr., Flint, Mich. 48507

[22] Filed: Mar. 1, 1973

[21] Appl. No.: 337,017

[52] U.S. Cl. ............................. 250/312, 250/476
[51] Int. Cl. ....................................... G01b 15/00
[58] Field of Search ........................ 250/312, 476

[56] References Cited
UNITED STATES PATENTS

| | | | |
|---|---|---|---|
| 1,370,640 | 3/1921 | Granger | 250/312 |
| 1,795,042 | 3/1931 | Rose | 250/312 |
| 2,329,187 | 9/1943 | De Lorimier et al. | 250/312 |
| 3,178,574 | 4/1965 | Stryker | 250/312 |
| 3,547,121 | 12/1970 | Cherry | 250/476 |

Primary Examiner—William F. Lindquist
Attorney, Agent, or Firm—Hauke, Gifford, Patalidis & Dumont

[57] ABSTRACT

A three dimensional X-ray opaque device for aiding in the location of foreign bodies embedded in human flesh, the device having three elongated members disposed at right angles to each other and including an indicating spot to identify a predetermined point on the device. With the use of an X-ray machine the device aids in determining the location of a foreign object embedded in some parts of the human body.

2 Claims, 5 Drawing Figures

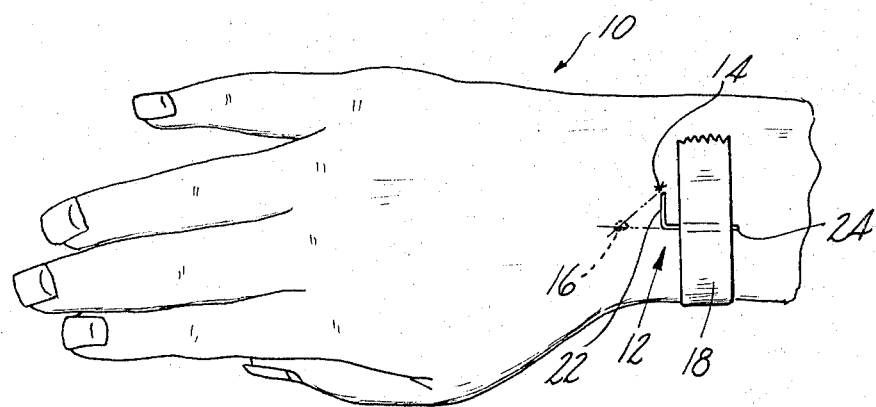
Fig-1
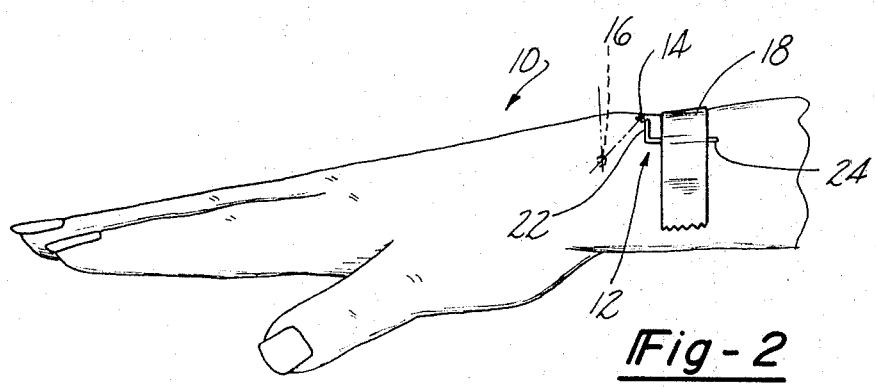
Fig-2
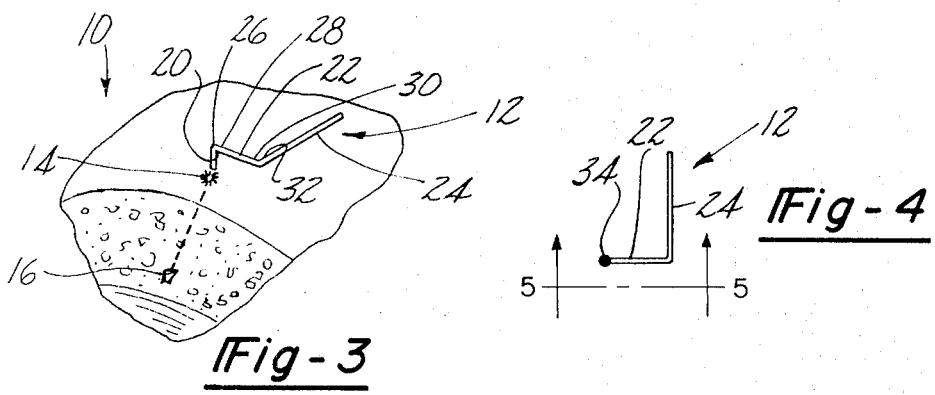
Fig-3
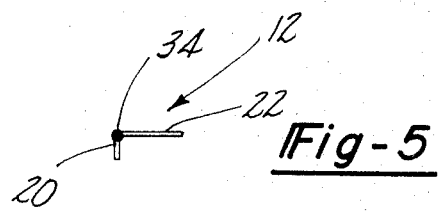
Fig-4
Fig-5

THREE DIMENSIONAL X-RAY OPAQUE FOREIGN BODY MARKER DEVICE

BACKGROUND OF THE INVENTION

1. Field of the Invention

The present invention relates to the field of art encompassing devices for defining the location of an object in a three dimensional environment. In particular, the present invention pertains to a novel device used as an aid in finding an object embedded in the flesh of the human body so that it can be removed with a minimum of surgery.

2. Description of the Prior Art

Human injuries caused by objects becoming embedded in some part of the human body are not infrequent. When such objects are projected into the flesh substantially perpendicularly to the surface, there is little difficulty in locating and removing the object. However, when the object projects into the flesh at an angle, location and thus removal of the object can be quite difficult. Since substantial surgery to find the object is often necessary, removal of such object can also be quite painful.

The prior art includes the use of a flat, or two dimensional marker to determine the location and orientation of a foreign object embedded in a part of the human anatomy. The flat marker is placed at or near the wound produced by the entry of the foreign object and X-rays are then made. A serious problem associated with such devices is that while the device is two dimensional, the foreign object must be located in a three dimensional space. This often means that a large number of X-rays must be obtained from various angles to totally define the location and orientation of the foreign object, and even at that, it is extremely difficult to accurately locate the object especially when the foreign object is small in size and located deeply inside a portion of the anatomy. If the location and orientation of the foreign object is not known accurately, a number of incisions may be required to remove it. Further, obtaining a large number of X-ray photographs is time consuming and expensive.

The present invention overcomes these problems by providing a simple, inexpensive, three dimensional foreign body marker device which makes it easier and faster to determine the accurate location and orientation of large and small foreign objects in the three dimensional environment of the anatomy from a relatively few X-ray photographs.

Another object of the present invention is to provide a foreign body marker device which does not require special X-ray positioning.

BRIEF DESCRIPTION OF THE INVENTION

The present invention provides a three dimensional foreign object marker device having three members arranged at predetermined angles to each other, and wherein each member is connected to one of the other members. The members are elongated and are disposed mutually perpendicular to each other. Further, each of the three elongated members may be of a different length and the device may include an enlarged portion to aid in identifying a predetermined point on the device so that the foreign object can be properly oriented with respect to the marker device.

BRIEF DESCRIPTION OF THE DRAWINGS

The invention is herein illustrated, by way of example only, in the following drawings where like numerals refer to like parts throughout the several views, and wherein:

FIG. 1 is a top view of a human hand and wrist showing a top view of the foreign object marker device of the present invention in place thereon;

FIG. 2 is a side view of the human hand and wrist shown in FIG. 1 illustrating a side view of the foreign object marker device in place thereon;

FIG. 3 is a perspective view of the foreign object marker device and a perspective sectional view of a portion of an anatomical structure in which the foreign object is embedded;

FIG. 4 is a top view of the foreign object marker device; and

FIG. 5 is an end view of the foreign object marker device as viewed from line 5—5 of FIG. 4.

DETAILED DESCRIPTION OF THE INVENTION

Referring first to FIGS. 1 and 2, there is shown an anatomical structure, such as a human hand and wrist 10. The foreign body marker device of the present invention, generally denoted as 12, is illustrated positioned thereon with a portion extending into a wound 14 caused by the entry of a foreign body 16 through the skin when entering the hand and wrist 10. The device 12 may be secured in place by a piece of tape 18.

Now, with particular reference to FIG. 3, the foreign body marker device 12 is comprised of three elements or members such as a first member 20, a second member 22 and a third member 24 which are disposed at predetermined angles to each other. Preferably, the members 20, 22 and 24 are generally elongated in shape and are oriented at mutual angles of 90° to each other. The elongated members may have any convenient cross-sectional shape, for example, they may be round, square or triangular. In the illustrated embodiment, the three elements are of different lengths to facilitate their identification on an X-ray photograph. In practice it has been found that a length of 0.5 centimeters for the first member 20, 1.0 centimeters for the second member 22 and 2.0 centimeters for the third member works well. The members 20, 22 and 24 are illustrated as being connected together at their ends, i.e., the first member 20 is connected at one of its ends 26 to the second member 22 at its first end 28, and the third member 24 is connected at one of its ends 32 to the second member 22 at its second end 30. It is apparent that for this invention to be operable it is only important that the three elongated members form a three dimensional structure and do not lie in the same plane. However, the preferred configurations of the three members are those in which the members are all mutually perpendicular.

Further, the members 20, 22 and 24 may be integrally formed, or may be separate components connected together, for example, by soldering.

In order to further facilitate the use of the marker device 12, it is advantageous to provide a way of identifying a particular predetermined point on the device upon viewing an X-ray photograph which includes the image of the device. This predetermined point can be used as a measuring datum point, or merely to identify a particular one of the members 20, 22 or 24 from which to take measurements. Referring to FIGS. 4 and 5, this can be accomplished by providing an indicating means, such as an elongated spot or blister 34 at the predetermined point. The blister 34 is illustrated as being located at the junction of the first member 20 and second member 22, however, it may be located at a free end or between the ends of any of the members 20, 22 or 24.

The foreign body marker device 12 finds its primary use in the medical field to determine the location of a foreign body or object embedded in a portion of the anatomical structure.

To use the device 12, it is placed on a skin surface of the anatomical structure, for example, the hand and wrist 10 in which the foreign body 16 is embedded, with a free end of the member 20 in contact with the skin surface either in close proximity to the entry wound 14, or with the member 20 actually extending into the entry wound 14, and with the second and third members 22 and 24 generally laying flat on the skin surface. Next, an X-ray photograph is made to determine the relationship and relative location of the foreign body 16 to the device 12. Because the shape and dimensions of the foreign body marker device 12 are known, by observing the position of the marker device 12 relative to the foreign body 16 as shown on the X-ray photograph, the location and orientation of the foreign body 16 can be easily determined. The coordinates of the foreign body from the device 12 are then transferred to, and marked on the hand and wrist 10. An incision is then made through that mark to remove the foreign body 16.

One method which may be used to transfer the coordinates of the foreign object from the X-ray photograph to the anatomical structure is to position the photograph over the anatomical structure and a light source under it. The image of the device 12 is then aligned with the actual device 12, and the position of the object transferred directly from the X-ray photograph without the necessity of first making measurements of the coordinates to the foreign body and then transferring these measurements to the anatomical structure.

Usually, at the most only two X-ray photographs are required, one showing an anterior-posterior view and another a lateral view to determine the coordinates of the foreign body.

It should be noted that by comparing the size and shape of the image of the device 12 with the known size and shape of the device, it is readily easy to determine whether or not an accurate X-ray photograph has been obtained.

The foregoing detailed descriptions are given primarily for clarity of understanding and no unnecessary limitations should be understood therefrom, for other modifications will be obvious to those skilled in the art upon reading this disclosure, and may be made without departing from the spirit of the invention or the scope of the appended claims.

I claim:

1. A three dimensional X-ray opaque foreign body marker device for use in combination with an X-ray machine of the type wherein X-rays are produced by an X-ray tube and directed through a part of the human anatomy and onto a photographic plate sensitive to exposure by X-ray radiation, wherein the improvement comprises:
    a first X-ray opaque elongated member;
    a second X-ray opaque elongated member which is connected at substantially right angles to said first elongated member; and
    a third X-ray opaque elongated member which is connected to at least one of the other said elongated members substantially perpendicular to the plane defined by the intersection of said first and second elongated members, whereby X-rays from said X-ray tube form an image of said marker device on said photographic plate from which an accurate determination of the location with respect to said marker device of an X-ray opaque foreign body disposed in part of said human anatomy can be made.

2. A three dimensional X-ray opaque foreign body marker device as claimed in claim 1, including means for indicating a predetermined point on said marker device.

* * * * *